June 4, 1957 W. A. BISHMAN 2,794,666
BATTERY CARRIER
Filed Aug. 3, 1955
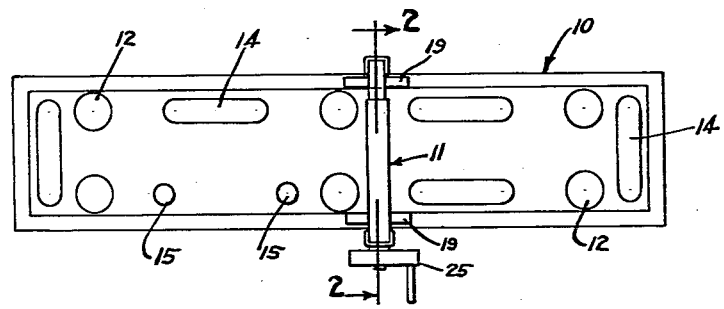
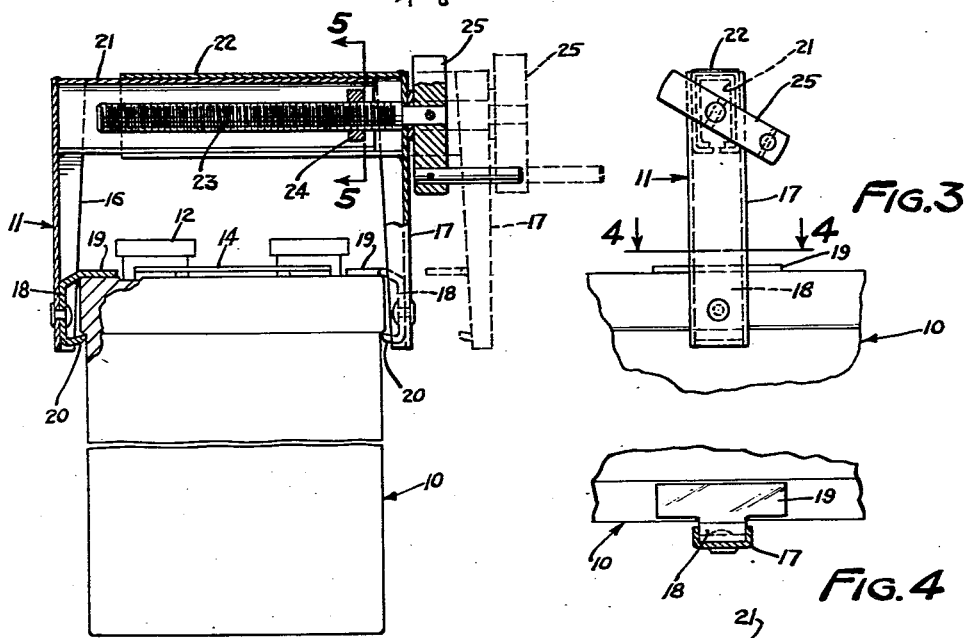
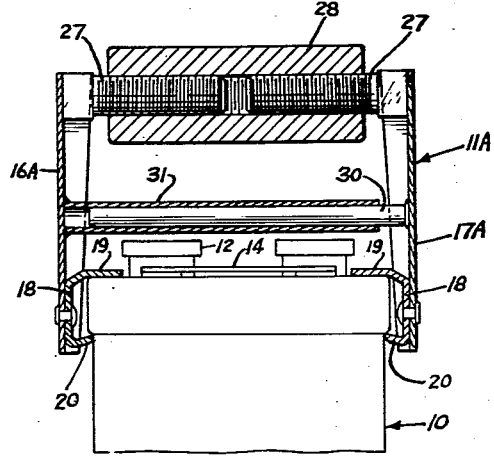
INVENTOR.
WALTER A. BISHMAN
BY
ATTORNEYS United States Patent Office 2,794,666
Patented June 4, 1957

2,794,666
BATTERY CARRIER

Walter A. Bishman, Minneapolis, Minn., assignor to Bishman Manufacturing Company, Osseo, Minn., a corporation of Minnesota Application August 3, 1955, Serial No. 526,160

12 Claims. (Cl. 294—16)

This invention relates to carriers for batteries. More particularly, this invention relates to adjustable handles for attachment to automotive storage battery cases so that they can readily be lifted and carried from place to place.

In the past, battery carrying handles have been widely used which comprise straps having sockets at both ends which fit over oppositely disposed battery connecting posts. When the handle is lifted, the weight of the battery causes the sockets to frictionally engage the connector posts. Because the connector posts have been disposed symmetrically, the battery is balanced when lifted and can be easily carried.

Recently, however, new motor cars have been equipped with 12 volt batteries on which the connector posts are positioned on the same side of the battery case. When lifted with a conventional carrying handle a new 12 volt battery is lopsided and unbalanced and difficult to carry. In addition, the connector posts are liable to damage due to the uneven strain upon them. Furthermore, the connector posts of 12 volt batteries are lighter in construction and contain smaller amounts of lead. Because they have less strength, it is inadvisable to carry 12 volt batteries by their connector posts.

With the advent of the 12 volt system, dealers, service men and the like are now confronted with a wide variety of battery sizes and shapes and with batteries having the connector posts in a variety of positions. Many of these batteries are not adapted to be carried by conventional carrying handles and several sizes and styles of handles are required to carry all of the common battery types.

It is the principal object of this invention to provide an adjustable carrying handle for attachment to automotive storage battery cases of all sizes and shapes, whether 6 volt or 12 volt.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which:

Figure 1 is a top plan view of a long type 12 volt automotive battery having a handle according to this invention attached thereto;

Figure 2 is a vertical section taken on the line 2—2 of Figure 1 and in the direction of the arrows, showing details of construction of the carrying handle;

Figure 3 is an end elevation of the carrying handle;

Figure 4 is a detail top plan view, partly in section, taken on the line 4—4 of Figure 3 and in the direction of the arrows, showing one of a pair of stabilizing bars or plates of the carrying handle;

Figure 5 is an enlarged vertical sectional view taken on the line 5—5 of Figure 2 and in the direction of the arrows showing further details of construction of the handle of this invention; and Figure 6 is a vertical section showing an alternative form of handle construction.

Referring now to the drawings, there is here shown in outline form a long-style 12 volt automotive storage battery 10 onto which is attached an adjustable carrying handle indicated generally at 11. On the top surface of the battery case there are positioned a plurality of filling caps 12 covering ports for introducing water to the battery cells, a plurality of bars 14 interconnecting the cells of the battery and terminals or connecting posts 15. It will be readily apparent from the position of the terminals that the conventional frictional engagement type handle is not suitable for carrying a battery such as is illustrated.

Carrying handle 11 comprises a pair of complementary upright supporting channel members 16 and 17 adapted to be disposed on opposite sides of a battery case. Fitted within the lower ends of the channel members and attached thereto by rivets, bolts, welding or the like are a pair of jaw forming memebrs 18. Members 18 are formed from flat generally T-shaped metal strap material bent into an irregular U-shape with the T-bar forming a horizontal stabilizer bar or plate 19 transverse to the axis of the channel members and the opposite narrow upturned end forming a gripping tooth 20. The stabilizing plates 19 extend beyond the inner edges of the channel members a sufficient distance that their lower surfaces rest upon the top surface of the battery case. Teeth 20 extend beyond the inner edges of the channel members just far enough to permit them to bite into the side surfaces of a battery case, but not sufficient for the teeth to embed deeply into the sides of the case. Teeth 20 are preferably sharpened somewhat to permit them to easily grasp the sides of a battery case.

The upper ends of channel members 16 and 17 are provided with generally inwardly projecting tubular telescoping handle members. In this instance channel member 16 is provided with an inner open-ended tube 21 and channel member 17 is provided with an outer open-ended tube 22. The open end of tube 21 is inserted in the open end of tube 22. The tubes are so sized as to have a loose sliding fit.

Journalled for rotation in the upper end of channel member 17 generally coaxial with tube 22 is an elongated threaded shaft or screw 23. A nut 24 fitted into a slot in the open end of tube 21 against rotation engages the threads of screw 23 for relative movement of the two telescopic tube members and their accessory channel and jaw forming members. To facilitate relative movement the reduced end of screw 23 which extends through channel member 17 is provided with a crank 25 keyed thereto or equivalent turning means.

A modified form of handle construction is shown in Figure 6. In this modified form of handle (indicated generally as 11A) the channel members 16A and 17A and jaw forming members 18, 19 and 20 are substantially identical with the structure described in connection with Figures 1 to 4. However, instead of being provided with telescoping tubular members, each of the channel members is provided at its upper end with a pair of screws 27 having threaded ends, one of which is provided with right handed threads and the other of which has left handed threads. The ends of the screws 27, opposite their respective threaded ends, are welded or otherwise secured to project inwardly substantially normal to the channel members. Fitted over the inwardly extending screws 27 is an internally threaded turnbuckle handle having corresponding right and left handed threads relative to the screws 27. By rotation of the turnbuckle 28, depending upon direction of rotation, screws 27 are brought closer together or moved farther apart permitting easy adjustment of this form of carrier to various sized storage batteries. This form of construction is especially useful for handling batteries in spaces of limited size.

Optionally, a telescoping stabilizing member is provided comprising a rod or tube 30 fixedly secured to the inside of one of the channel members and extending inwardly substantially normal to the channel to cooperate with a loose sliding fit within a similarly positioned outer tube 31 fixed to the inside of the opposite channel member.

Where working space is at a premium one of the channel members may be replaced with a flat bar or strap provided with a stabilizing plate 19 but without a gripping tooth 20. The action of a stabilizing plate and tooth on one side of the battery case cooperating with just a stabilizing plate on the other side still permits the battery to be lifted and carried. Alternatively, the lower end of the channel member below the stabilizing bar can simply be flattened.

In the operation of the carrying handle of this invention, the jaws of the handle are first opened so as to be wider than the battery to be carried. This is accomplished either by turning crank 25 in the form of construction shown in Figures 1 to 5 or by rotating turnbuckle 28 in the modified construction of Figure 6. The handle is shown in open position in broken lines in Figure 2. The handle is positioned over the battery case at about its center crosswise to the long axis of the battery. One of the stabilizing plates 19 is placed on the top edge of the case to position and steady the handle as it is being closed upon the battery case. The handle is closed until both stabilizing plates rest on opposite top edges of the case and it is further tightened until the teeth 20 bite into the opposite sides of the case. The battery can then be picked up readily by the handle.

Teeth 20 are partially recessed in the channels to prevent the teeth or jaws from being embedded too deeply into the case should an operator attempt to over-tighten the handle. When the battery is being carried stabilizing plates 19 prevent the handle from tipping in relation to the battery case.

The carrier of this invention is readily adjustable so as to be adapted for lifting and carrying batteries of a wide variety of widths and shapes. The gripping pressure exerted upon the battery is independent of the weight of the battery. This carrier operates without danger of damage to the battery terminals.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A battery carrier comprising a pair of substantially parallel supporting members connected at their upper ends by a handle member, tooth means projecting inwardly from the lower end of at least one of said supporting members, a stabilizer plate extending inwardly from each of said supporting members intermediate of the ends thereof and transverse to the longitudinal axis thereof in a position to contact the top of the battery case for cooperative engagement with a battery case in combination with said tooth means and means connected to said supporting members for varying the width between said supporting members.

2. A carrier according to claim 1 further characterized in that each of said supporting members is provided with tooth means at their lower ends.

3. A carrier according to claim 1 further characterized in that said supporting members are channel shaped and said tooth means are partially recessed in the channel.

4. A carrier according to claim 1 further characterized in that said handle member is telescopic and comprises an inner tube secured to one of said supporting member and an outer tube secured to the other of said supporting members, said tubes fitting together with a sliding fit.

5. A carrier according to claim 4 further characterized in that said means connecting the supporting members includes an elongated screw journalled in the upper end of one of said supporting members for rotation within said outer tube, a cooperating nut secured against rotation in the open end of the inner tube and means outside the handle for rotating said screw.

6. A carrier according to claim 5 further characterized in that said rotating means is a crank.

7. An adjustable carrier adapted to permit the lifting and carrying of automotive storage batteries of a variety of widths, which carrier comprises a pair of substantially parallel supporting members adapted to extend upwardly from adjacent the sides of a storage battery case, a telescoping handle member connecting the upper ends of said supporting members and adapted to extend across the top of the battery case above the top surface thereof, tooth means adapted to engage the side surface of the battery case projecting inwardly from the lower end of at least one of said supporting members, a stabilizing plate adapted to rest horizontally on the top edge surface of the battery case extending inwardly from each of said supporting members intermediate of the ends thereof and transverse to the longitudinal axis thereof and means for adjusting the length of the telescoping handle member for varying the width between said supporting members for attaching and detaching said carrier and adapting it to batteries of varying widths.

8. A carrier according to claim 7 further characterized in that each of said supporting members is provided with tooth means at their lower ends.

9. A carrier according to claim 7 further characterized in that said supporting members are channel shaped and said tooth means are partially recessed in the channel whereby the tooth means are prevented from embedding too deeply in the sides of the battery case.

10. A carrier according to claim 7 further characterized in that said telescoping handle member comprises an inner tube secured to one of said supporting member and an outer tube secured to the other of said supporting members, said tubes fitting together with a sliding fit.

11. A carrier according to claim 10 further characterized in that said adjusting means comprises an elongated screw journalled in the upper end of one of said supporting members for rotation within said outer tube, a cooperating nut secured against rotation in the open end of the inner tube and means outside the handle for rotating said screw.

12. A carrier according to claim 11 further characterized in that said rotating means is a crank.

References Cited in the file of this patent
UNITED STATES PATENTS

| | | |
|---|---|---|
| 1,529,518 | Noller | Mar. 10, 1925 |
| 1,779,291 | Richardson | Oct. 21, 1930 |
| 2,717,171 | Gottstein | Sept. 6, 1955 |